United States Patent Office 3,600,455
Patented Aug. 17, 1971

3,600,455
PRODUCTION OF 4-METHYL PENTENE-1
Fred Dean, Stockton-on-Tees, England, assignor to Imperial Chemical Industries Limited, London, England
No Drawing. Filed Dec. 9, 1969, Ser. No. 883,586
Claims priority, application Great Britain, Dec. 19, 1968, 60,425/68
Int. Cl. B01j *11/58;* C07c *1/24*
U.S. Cl. 260—682                                      4 Claims

ABSTRACT OF THE DISCLOSURE

A process for producing 4-methyl pentene-1 which comprises dehydrating 4-methyl pentan-1-ol or 4-methyl pentan-2-ol by passing it over a dehydration catalyst comprising alkalised alumina.

---

This invention relates to methods for manufacturing 4-methyl pent-1-ene, a substance useful for the production of polymers possessing distinctive qualities.

4-methyl pentene-1 is currently produced by dimerising propylene, a process which not only affords relatively low yields of the desired dimer but also gives rise to substantial proportions of skeletal and double-bond isomers. Unwanted skeletal isomers are n-hexene-1 and 2,3-dimethyl butene-1 which, as α-olefines, should be removed as completely as possible from the 4-methyl pentene-1 before it is used in polymer formation. A double-bond isomer is 4-methyl pentene-2. The close proximity of the boiling points of 4-methyl pentene-1 and the aforementioned skeletal isomers renders it necessary to use elaborate and very costly distillation apparatus for the sufficient purification of the product 4-methyl pentene-1. In the course of this distillation, 4-methyl pentene-2 is also removed although the applicants have discovered that the presence of substantial proportions of 4-methyl pentene-2 in 4-methyl pentene-1 fed to a polymerisation reaction is not in fact detrimental to good polymer formation. The 4-methyl pentene-2 merely serves as monomer diluent replacing at least a proportion of currently used purchased diluents.

The process of the present invention for preparing 4-methyl pentene-1 is the fruitful outcome of an enquiry into suitable commercially relevant alternative methods for preparing 4-methyl pentene-1 which do not result in the co-production of any, or of substantial quantities of other α-olefines necessitating costly separation procedures.

The present invention provides a process for the manufacture of 4-methyl pentene-1 which comprises dehydrating 4-methyl pentan-2-ol or 4-methyl pentan-1-ol by passing it over a dehydration catalyst comprising alkalised alumina. Alkalised alumina and alumina-containing catalysts, e.g. silica-aluminas, are already well known for alcohol dehydration. The dehydration is carried out in the liquid phase. The treatment of these catalysts with bases, which may be alkali metal bases or nitrogen bases, amongst which piperidine may be singled out for special mention, is effective to neutralise strongly acid sites on the alumina, which are the sites active for olefine isomerisation, while leaving catalytically active weakly acidic sites available for dehydration reaction. An especially suitable alumina for use in catalyst formation is alumina prepared from aluminium isopropoxide or aluminium nitrate and ammonia and calcined at 600° to 800° C. Pretreatment with alkali metal base may be accomplished by incorporating sodium or potassium carbonate in the alumina prior to calcining, say in a quantity such that the resultant alkalised alumina contains 1% by weight of sodium or potassium ions. Treatment with nitrogen base such as ammonia, pyridine, or piperidine is preferred and is conveniently accomplished by including the base in the alcohol liquor feed, say in a quantity of around 10% by weight based on the quantity of alcohol.

The dehydration reaction is advantageously carried out at a temperature within the range of from 250° to 350° C., for example 275° C., there being no apparent merit in operating at substantially higher or lower temperatures. Present indications are that preferred operating temperatures will be found to lie within the range of from 260° to 320° C.

The product obtained from dehydration of 4-methyl pentan-1-ol is almost wholly 4-methyl pentene-1. The product obtained by dehydrating 4-methyl pentan-2-ol is a mixture of 4-methyl pentene-1 and substantial amounts of 4-methyl pentene-2, with the desired olefine ordinarily being the primary product. Nevertheless, preliminary indications are that very high yields of 4-methyl pentene-1 may be obtainable by this route also. No evidence suggesting the formation of other α-olefines has been obtained, the reactions appearing to be clean although the formation of small amounts of other olefines under particular less suitable operating conditions cannot be ruled out. It may be mentioned that the formation of other α-olefines by double-bond migration with these catalysts and the present starting materials is thermodynamically highly improbable.

The 4-methyl pentan-2-ol may best be prepared by a process using acetone as raw material. The acetone is first caused to undergo self-condensation in the presence of mild alkali to form diacetone alcohol which either simultaneously or under acid conditions is dehydrated to form mesityl oxide which in turn is hydrogenated to form 4-methyl pentan-2-ol, a starting material for the present process. Yields of at least 85% of theory based on acetone are obtainable in commercial scale operation.

4-methyl pentan-1-ol may be prepared anologously from isobutyraldehyde and acetaldehyde, there being here two primary condensation products. These, on dehydration, give respectively crotonaldehyde which is a valuable by-product, and 4-methyl pent-2-en-1-al, which is hydrogenated to 4-methyl pentan-1-ol. Isobutyraldehyde is now becoming available as a large tonnage, low cost, by-product.

The following example illustrates the invention.

EXAMPLE

Stage 1.—Formation of methyl-2 methyl allyl ketone

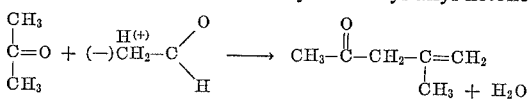

Quantitative conversion of acetone in 20% caustic soda at 90° C. gives a 95% yield of methyl-2 methyl allyl ketone in a continuous reactor using a 10-minute residence time. The reaction is carried out in an inert atmosphere at pressure of 5 atmospheres gauge.

Stage 2.—Hydrogenation of methyl-2 methyl allyl ketone

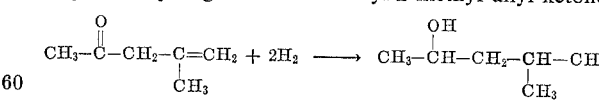

A quantitative yield at ~100% conversion of methyl isobutyl carbinol is obtained by hydrogenation of methyl-2 methyl allyl ketone at 120° C. and 40 atmospheres gauge pressure using a residence time of 0.5–1 hour. A commercial Cu/Ni catalyst is used.

Stage 3.—Dehydration of methyl isobutyl carbinol (MIBC)

Dehydration occurs when MIBC containing 10% by weight of piperidine is passed over an alumina alcohol dehydration catalyst at 275° C. at a pressure of 20 atmospheres gauge using a residence time of 0.5 hour. The dehydration product contains about 81% 4-methyl pentene-1, the remainder including about 16% 4-methyl pentene-2 with no detectable quantity of 2-methyl pentene-1.

I claim:

1. A process for producing 4-methyl pentene-1 which comprises dehydrating 4-methyl pentan-1-ol or 4-methyl pentan-2-ol by passing it over an alkalised alumina dehydration catalyst, the dehydration catalyst being alkalised by a nitrogenous base included in the alcohol feed.

2. A process as claimed in claim 1, wherein the dehydration catalyst is alkalised by piperidine or pyridine included in the alcohol feed.

3. A process as claimed in claim 1, wherein the reaction is carried out at a temperature in the range of from 250° to 350° C.

4. A process as claimed in claim 1, wherein 4-methyl pentan-2-ol is dehydrated, having been obtained by dimerising acetone to form mesityl oxide, and hydrogenating the mesityl oxide.

References Cited

UNITED STATES PATENTS

| 2,468,764 | 5/1949 | Laurent | 260—682 |
| 3,126,426 | 3/1964 | Turnquest et al. | 260—683.3 |

DELBERT E. GANTZ, Primary Examiner

G. E. SCHMITKONS, Assistant Examiner

U.S. Cl. X.R.

252—438